United States Patent [19]

Dietz

[11] Patent Number: 5,355,725
[45] Date of Patent: Oct. 18, 1994

[54] METHOD FOR DETERMINING THE MASS FLOW RATE OF SOLIDS IN A CYCLONE SEPARATOR FOR A FLUIDIZED BED REACTOR

[75] Inventor: David H. Dietz, Hampton, N.J.

[73] Assignee: Foster Wheeler Energy Corporation, Clinton, N.J.

[21] Appl. No.: 82,630

[22] Filed: Jun. 25, 1993

[51] Int. Cl.⁵ .................. G01F 15/02; B09B 3/00; F22B 1/00
[52] U.S. Cl. .................................... 73/198; 122/4 D
[58] Field of Search .................. 73/198, 700, 861.04; 48/197 R; 55/337; 122/4 D; 431/7

[56] References Cited

U.S. PATENT DOCUMENTS

| | | | |
|---|---|---|---|
| 4,169,714 | 10/1979 | Calvert | 55/337 |
| 4,355,601 | 10/1982 | Hattiangadi | 122/4 D |
| 4,594,967 | 6/1986 | Wolowodiuk | 122/4 D |
| 4,597,774 | 7/1986 | Garcia-Mallol et al. | 48/197 R |
| 4,688,418 | 8/1987 | Cheung et al. | 73/700 |
| 4,773,339 | 9/1988 | Garcia-Mallol | 110/345 |
| 4,781,574 | 11/1988 | Taylor | 431/7 |
| 4,896,717 | 1/1990 | Campbell, Jr. et al. | 165/104.18 |

*Primary Examiner*—Richard E. Chilcot, Jr.
*Assistant Examiner*—William L. Oen
*Attorney, Agent, or Firm*—Marvin A. Naigur

[57] ABSTRACT

The present invention is directed to a method for determining the mass flow rate of solids in a cyclone separator having an inlet for receiving a mixture of solids and gases and an outlet for discharging the separated gases. The method includes measuring the gas pressures at the inlet, in the separator, and at the outlet, and utilizing these pressure values to establish a ratio of the pressure drop across the outlet to the pressure drop across the separator. This ratio is then used to determine the mass flow rate of the solids into the cyclone.

2 Claims, 1 Drawing Sheet

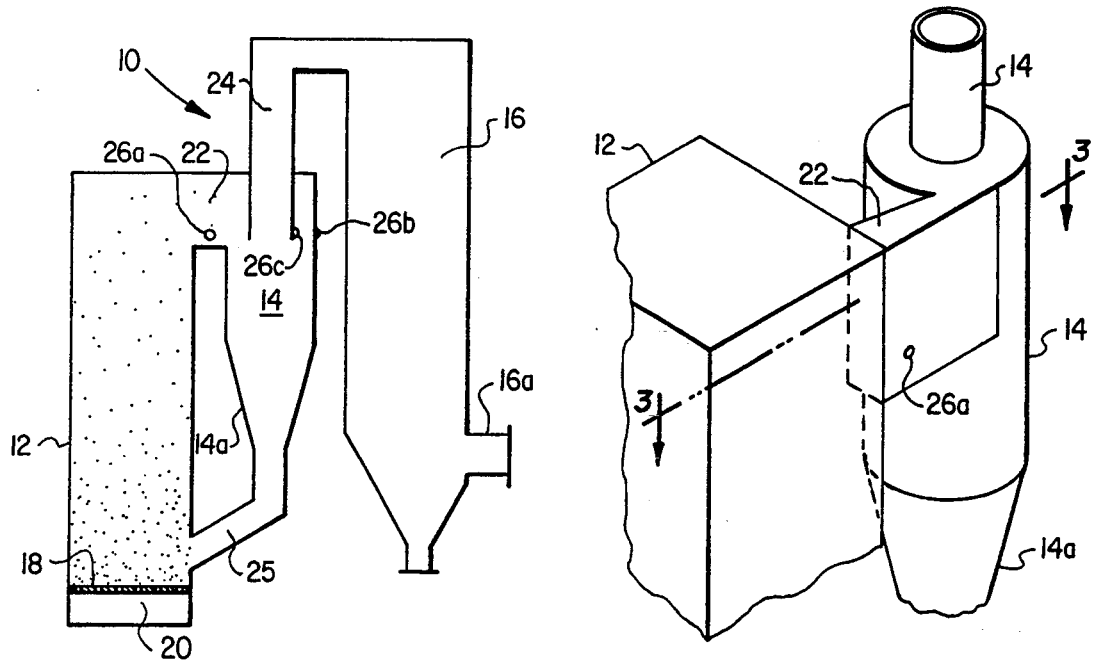
FIG. 1  FIG. 2
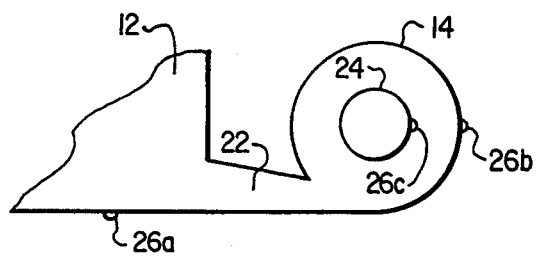
FIG. 3
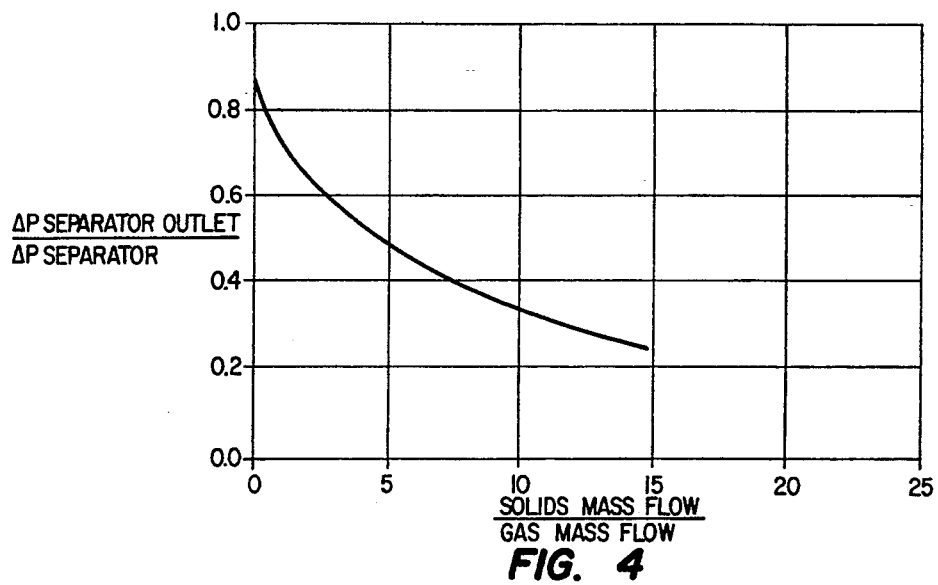
FIG. 4

METHOD FOR DETERMINING THE MASS FLOW RATE OF SOLIDS IN A CYCLONE SEPARATOR FOR A FLUIDIZED BED REACTOR

BACKGROUND OF THE INVENTION

This invention relates to a method for determining the mass flow rate of solids into a cyclone separator for a fluidized bed reactor and, more particularly, to such a method in which the solids mass flow rates are determined by measuring the gas pressures at various locations relative to the separator.

Fluidized bed reactors including combustors, gasifiers, and steam generators are well known. In these arrangements, air is passed through a bed of particulate material, including a fossil fuel, such as coal, and an adsorbent for the sulfur generated as a result of combustion of the coal, to fluidize the bed and to promote the combustion of the fuel at a relatively low temperature. The fluidized bed reactor thus offers an attractive combination of high heat release, high sulfur adsorption, low nitrogen oxides emissions and fuel flexibility.

Some fluidized bed reactors utilize what is commonly referred to as a bubbling fluidized bed in which a bed of particulate materials is supported by an air distribution plate, to which combustion-supporting air is introduced through a plurality of perforations in the plate, causing the material to expand and take on a suspended, or fluidized, state. The heat produced by combustion within the fluidized bed is utilized for various purposes such as to raise the temperature of a heat exchange medium, such as water, to generate steam.

In an effort to extend the improvements in combustion efficiency, pollutant emissions control, and operation turn-down afforded by the bubbling bed, a fluidized bed reactor has been developed utilizing a fast, or circulating, fluidized bed. According to this technique, higher fluidized bed densities are attained which is well below those of a typical bubbling fluidized bed. The formation of the low density circulating fluidized bed is due to its small particle size and to a high solids throughput. The velocity range of a circulating fluidized bed is between the solids terminal, or free fall, velocity and a velocity which is a function of the throughput, beyond which the bed would be converted into a pneumatic transport line.

In these circulating fluidized bed arrangements, a cyclone separator is often provided for receiving a mixture of gases, essentially comprising the fluidizing air and products of combustion, along with some entrained solid particles from the fluidized bed (hereinafter termed "solids"). The cyclone separator functions to separate the entrained solids from the gases and route the gases to a heat recovery area and the solids back to the furnace section of the reactor.

In these arrangements, it is very important to determine and regulate the mass flow of the solids into the separator, since this flow affects other important operational parameters of the reactor. However, to date there has been no effective, relatively inexpensive, technique for determining the solids mass flow rate into the cyclone separator.

SUMMARY OF THE INVENTION

It is therefore an object of the present invention to provide a method for determining the mass flow rate of solids into a cyclone separator.

It is a further object of the present invention to provide a method of the above type in which the solids mass flow rates are determined by establishing gas pressures at various locations relative to the separator.

It is a still further object of the present invention to provide a method of the above type in which the ratio of the pressure drop across the separator outlet to the pressure drop across the separator is used to determine the solids mass flow rate.

Towards the fulfillment of these and other objects, the present invention is directed to a method for determining the mass flow rate of solids in a cyclone separator having an inlet for receiving a mixture of solids and gases and an outlet for discharging the separated gases. The method includes measuring the gas pressures at the inlet, in the separator, and at the outlet, and establishing a ratio of the pressure drop across the outlet to the pressure drop across the separator. This ratio is then used to determine the mass flow rate of the solids into the separator.

BRIEF DESCRIPTION OF THE DRAWINGS

The above brief description, as well as further objects, features and advantages of the present invention will be more fully appreciated by reference to the following detailed description of the presently preferred, but nonetheless, illustrative embodiments in accordance with the present invention when taken in conjunction with the accompanying drawings wherein:

FIG. 1 is a schematic front view of a fluidized bed reactor relating to the method of the present invention.

FIG. 2 is an enlarged perspective view of a portion of the reactor of FIG. 1;

FIG. 3 is a cross sectional view taken along the line 3—3 of FIG. 2; and

FIG. 4 is a graph depicting the relationship between gas pressures and solids flow according to the method of the present invention.

DESCRIPTION OF THE PREFERRED EMBODIMENT

Referring to FIGS. 1 and 2 of the drawings, the reference numeral 10 refers in general to a fluidized bed reactor, in the form of a steam generator, which includes a furnace section 12, a cyclone separator 14 and a heat recovery area 16. An air distributor, or grate, 18 is provided in the lower portion of the furnace section 12 to define a plenum 20 for reasons that will be described.

The separator 14 is in the form of a cylindrical vessel having a conical hopper section 14a extending from its lower end and which receives a mixture of air and the products of combustion from the furnace section 12 along with the solids entrained thereby. To this end, a horizontal duct 22 extends from an opening in the upper portion of the rear wall of the furnace section to a tangential opening (FIG. 2) formed in the upper end portion of the separator 14.

The separator 14 operates to separate the solids from the gases, and a vertically-extending outlet duct 24 extends from the interior of the separator to the heat recovery area 16 for passing the gases to the latter area. The gases, after passing through the heat recovery area 16 exit therefrom via an outlet conduit 16a. The solids from the separator 14 fall down into a hopper section 14a of the separator where they are reinjected, via a recycle conduit 25, to the lower portion of the furnace section 12. The separator 14 may be of the type disclosed in U.S. Pat. No. 4,904,286 or U.S. Pat. No. 5,116,394 both of which are assigned to the assignee of the present invention.

Referring to FIG. 3, three pressure taps 26a, 26b, and 26c are provided at the inlet duct 20, at the upper end of the separator 14, and at the outlet duct 22 respectively. The pressure taps 26a, 26b, and 26c are vertically aligned (FIG. 1), are of a conventional design and are adapted to respectively measure the fluid pressure at the inlet of the separator, in the separator itself and at the outlet of the separator, for reasons to be described.

In operation, solids, in the form of particulate fuel material and adsorbent are introduced into the furnace section 12 and accumulate on the grate 18. Air from an external source passes into the plenum 20, through the grate 18, and into the solids on the grate. A light-off burner (not shown) or the like, is disposed in the furnace section 12 and is fired to ignite the fuel material in the bed and, when the temperature reaches a higher level, additional particulate fuel is discharged onto the upper portion of the bed. The velocity of air introduced to the bed is increased until it exceeds the minimum fluidizing velocity so that a fluidized bed is formed.

A mixture of air and gaseous products of combustion pass upwardly through the bed and entrain, or elutriate, the relatively fine solids in the bed. The resulting mixture passes upwardly in the furnace section 12 by convection before it exits the furnace section through the duct 22 and passes into the separator 14.

The mixture of gases and entrained solids thus enter and swirl around in the annular chamber defined between the inner cylindrical wall of the separator 14 and the lower end portion of the vertical duct 24. The entrained solids are thus propelled against the inner cylindrical wall of the separator where they collect and fall downwardly by gravity into the hopper section 14a. The relatively clean gases remaining in the annular chamber enter the duct 24 through its lower end and pass through the length of the duct 24 externally of the separator and into the heat recovery area 16 for further treatment.

The pressure taps 26a, 26b, and 26c measure the gas pressure at the inlet duct 20, the separator 14, and the outlet duct 22 to enable the pressure drop across the separator outlet and the pressure drop across the separator to be determined.

According to a main feature of the present invention, the ratio of the aforementioned outlet pressure drop to the separator pressure is used to determine the solids mass flow rate. This ratio is determined as follows, $$\text{RATIO} = \frac{Ps - Po}{Pi - Po} = \frac{\text{separator outlet pressure drop}}{\text{separator pressure drop}}$$

Where:
- Ps equals the gas pressure in the separator 14 (pressure tap 26b)
- Po equals the gas pressure in the outlet duct 24 (pressure tap 26c)
- Pi equals the gas pressure in the inlet duct 22 (pressure tap 26a)

The above is possible as a result of the discovery that there is a correlation between the above ratio and the solids mass flow rate. More particularly, reference is made to the graph of FIG. 4 which depicts the relation between the above ratio and the ratio of the solids mass flow to the gas mass flow rate into an 18 inch diameter cyclone for a composite of inlet velocities. As shown on the graph, the above pressure ratio falls from an initial value of approximately 0.9 for the case of no solids flow, to a value slightly greater than 0.2 at a solids flow greater than 10 lb. of solids flow per pound of gas flow.

It is understand that electronic circuitry and a computer can be provided which receives the pressure readings from the pressure taps 26a, 26b, and 26c, computes the above-mentioned ratios and determines the solids mass flow to the separator 14.

It is thus seen that the method of the present invention enables the solids mass flow to the separator (i.e., the "solids loading") to be determined in a relatively simple and inexpensive manner.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for determining the mass flow rate of solids in a cyclone separator having an inlet for receiving a mixture of solids and gases and an outlet for discharging the separated gases, said method comprising the steps of measuring the gas pressure at said inlet, measuring the gas pressure in said separator, measuring the gas pressure at said outlet, determining a first pressure drop across said outlet, determining a second pressure drop across said separator, determining the ratio of said first pressure drop to said second pressure drop, and establishing a curve of the relationship of said ratio to the ratio of the solids mass flow rate to the gas mass flow rate to enable the solids mass flow rate to be determined.

2. The method of claim 1 wherein said steps of measuring comprises the steps of providing three vertically aligned pressure taps at said separator, said inlet and said outlet, respectively.

* * * * *